(12) United States Patent
Tian et al.

(10) Patent No.: US 11,952,666 B2
(45) Date of Patent: Apr. 9, 2024

(54) PREPARATION METHOD FOR WEAR-RESISTANT COATING ON CYLINDRICAL INNER WALL SURFACE OF ALUMINUM ALLOY

(71) Applicant: AECC BEIJING INSTITUTE OF AERONAUTICAL MATERIALS, Beijing (CN)

(72) Inventors: Haoliang Tian, Beijing (CN); Yang Yu, Beijing (CN); Changliang Wang, Beijing (CN); Mengqiu Guo, Beijing (CN); Zimin Zhou, Beijing (CN); Zhihui Tang, Beijing (CN); Ang Zhang, Beijing (CN); Yongjing Cui, Beijing (CN); Tianying Wang, Beijing (CN); Junguo Gao, Beijing (CN)

(73) Assignee: AECC BEIJING INSTITUTE OF AERONAUTICAL MATERIALS, Beijing (CN)

( * ) Notice: Subject to any disclaimer, the term of this patent is extended or adjusted under 35 U.S.C. 154(b) by 348 days.

(21) Appl. No.: 17/420,516

(22) PCT Filed: Jun. 17, 2020

(86) PCT No.: PCT/CN2020/000140
§ 371 (c)(1),
(2) Date: Jul. 2, 2021

(87) PCT Pub. No.: WO2021/012627
PCT Pub. Date: Jan. 28, 2021

(65) Prior Publication Data
US 2021/0388506 A1    Dec. 16, 2021

(30) Foreign Application Priority Data
Jul. 22, 2019   (CN) .......................... 201910660775.4

(51) Int. Cl.
*C23C 30/00* (2006.01)
*B22F 1/052* (2022.01)
(Continued)

(52) U.S. Cl.
CPC .............. *C23C 30/00* (2013.01); *B22F 1/052* (2022.01); *B22F 1/10* (2022.01); *B22F 1/102* (2022.01);
(Continued)

(58) Field of Classification Search
None
See application file for complete search history.

(56) References Cited

U.S. PATENT DOCUMENTS

2004/0219344 A1    11/2004   Andes et al.
2012/0161098 A1    6/2012    Hiura et al.
(Continued)

FOREIGN PATENT DOCUMENTS

CN    104313446 A    1/2015
CN    104498938 A    4/2015
(Continued)

OTHER PUBLICATIONS

International Search Report issued in International Application No. PCT/CN2020/000140 dated Sep. 1, 2020 (3 pages).
(Continued)

*Primary Examiner* — Shamim Ahmed
*Assistant Examiner* — Bradford M Gates
(74) *Attorney, Agent, or Firm* — Osha Bergman Watanabe & Burton LLP

(57) ABSTRACT

A method for producing an abrasion-resistant coating on the inner wall of an aluminum alloy workpiece is provide. The steps include mixing a graphene powder and Al powder to obtain a mixed powder; combining and heating the mixed power with a polyvinyl alcohol (PVA) liquid, and perform-
(Continued)

ing spray granulation to obtain a low-temperature self-propagating composite; stirring a slurry comprising the low-temperature self-propagating composite and sodium silicate; injecting the slurry into a cylindrical inner cavity of an aluminum alloy workpiece mounted on a horizontal rotary table for rotation, the aluminum alloy workpiece is heated with the rotation at a second temperature of 80-100° C. so that the slurry is uniformly solidified on the cylindrical inner surface of the cylindrical inner cavity; and burning the slurry, after the slurry is uniformly solidified and while the rotation is maintained, with an oxyacetylene flame to form the wear-resistant coating.

10 Claims, 1 Drawing Sheet

(51) Int. Cl.
    *B22F 1/10*      (2022.01)
    *B22F 1/102*      (2022.01)
    *B22F 1/107*      (2022.01)
    *B22F 1/12*      (2022.01)
    *C09D 5/00*      (2006.01)
    *C09D 131/04*      (2006.01)
    *C22C 9/00*      (2006.01)
    *C23C 24/10*      (2006.01)
    *C08K 3/00*      (2018.01)

(52) U.S. Cl.
    CPC ............ *B22F 1/107* (2022.01); *B22F 1/12* (2022.01); *C09D 5/00* (2013.01); *C09D 131/04* (2013.01); *C22C 9/00* (2013.01); *C23C 24/103* (2013.01); *C08K 3/00* (2013.01); *C08K 2201/005* (2013.01)

(56) References Cited

U.S. PATENT DOCUMENTS

| | | | |
|---|---|---|---|
| 2015/0111045 A1* | 4/2015 | Chang | C09D 5/26 |
| | | | 427/430.1 |
| 2020/0009653 A1* | 1/2020 | Tseng | B22F 3/225 |

FOREIGN PATENT DOCUMENTS

| | | |
|---|---|---|
| CN | 104556726 A | 4/2015 |
| CN | 106191613 A | 12/2016 |
| CN | 107319948 A | 11/2017 |
| CN | 110284039 A | 9/2019 |

OTHER PUBLICATIONS

Written Opinion issued in International Application No. PCT/CN2020/000140 dated Sep. 1, 2020 (6 pages).

* cited by examiner

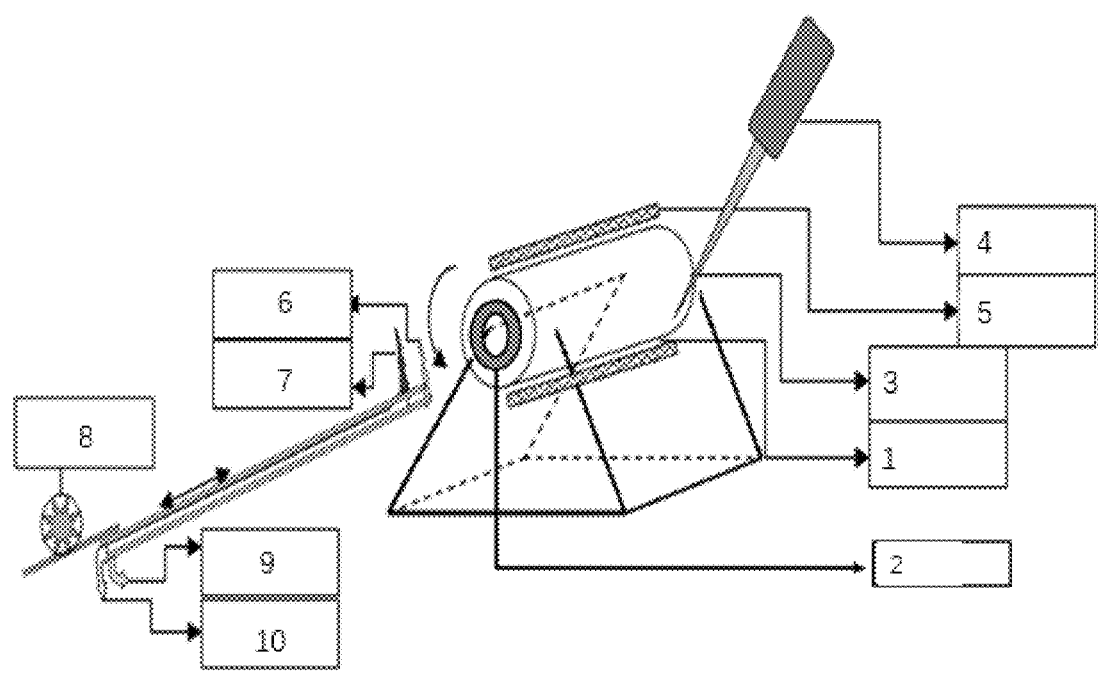

PREPARATION METHOD FOR WEAR-RESISTANT COATING ON CYLINDRICAL INNER WALL SURFACE OF ALUMINUM ALLOY

TECHNICAL FIELD

The present invention relates to the technical field of graphene self-lubricating wear-resistant coating preparation by a low-temperature self-propagating process; in particular, the preparation method includes generating a wear-resistant coating on the cylindrical inner surface of an aluminum alloy.

BACKGROUND

Aluminum alloys have the advantages of low density, high strength and good processing performance and are widely used for manufacturing various cylinder parts. However, the low hardness, poor wear resistance and poor corrosion resistance limit the application of such alloys. These defects can be improved by different surface-modification methods. At present, the main surface treatment methods for modified aluminum alloys, both domestically and abroad, are electroplating, anodizing, thermal spraying, laser cladding, microarc oxidation and so on. Among these methods, electroplating, anodization and microarc oxidation are the most suitable technologies for the protection of the wear-resistant coatings on the inner wall of an aluminum alloy cylinders. Thermal spraying and laser cladding are limited by the inner diameter (diameter 35~100 mm) and the thermal damage of the aluminum alloy substrate (the temperature-bearing capacity of an aluminum alloy is less than 660° C.).

The principle of self-propagating high-temperature synthesis coating technology is to use the exothermic reaction to self-heat the system and self-conduct in the system as a materials-synthesis technology. Once the reactants in the reaction system are ignited by the external heat source, the reaction spreads rapidly from the reaction area to the non-reaction area in the form of a combustion wave. Compared to conventional spraying technology, self-propagating high-temperature synthesis coating technology has the advantages of fast heat dissipation, no spraying particle acceleration, a simple ignition device structure and less smoke generation.

High-temperature self-propagating technology can be used to prepare wear-resistant coatings for cylinder parts with different inner diameters, but the limitation in this preparation process is that the temperature of the system is too high. Al and $Fe_2O_3$ are the basic components of these high-temperature self-propagating synthesis coatings. The wettability of Fe and $Al_2O_3$, produced by the reaction between the two materials, is poor. The maximum adiabatic temperature of this reaction can reach 3509 K, which is not only higher than the melting point of the aluminum alloy oxide, $Al_2O_3$ (2313 K), but is also much higher than the Al boiling point (2723 K). A large amount of Al evaporates during the reaction, which not only forms a large number of pores in the coating but also causes an imbalance in the ratio of reaction products. Considering the low melting point of the aluminum alloy cylinder substrate, the mechanical properties of the aluminum alloy decrease drastically when its temperature is higher than 660° C.; therefore, it is necessary to improve the existing high-temperature self-propagating coating-forming technology.

SUMMARY

One or more embodiments of the present disclosure provide a wear-resistant coating for the cylindrical inner surface of an aluminum alloy.

One or more embodiments of the present disclosure are described as FIG. 1, including the following numbered components: 1—aluminum alloy workpiece, 2—slurry, 3—rotary table, 4—temperature monitoring, 5—water cooling system, 6—cooling gas, 7—spraying flame, 8—stepping device, 9—cooling gas, and 10—oxygen acetylene.

One or more embodiments of the present disclosure provide a preparation method for generating a wear-resistant coating on the cylindrical inner surface of an aluminum alloy, comprising the following steps:

Step 1: First, the graphene powder and the Al powder are evenly mixed; the graphene has a lamellar structure and the mass percentages of the graphene and Al are (0.1~0.5):(99.5~99.9). In some embodiments, the lamellar thickness is 1~5 nm.

The mixed powder is obtained upon combining the $Fe_2O_3$ powder, ZnO powder, $SiO_2$ powder, $B_2O_3$ powder and Cu-5 wt % Ti alloy powder, in which the mass percentage of Cu and Ti in Cu-5 wt % Ti is 95:5.

The mass percentages of each component in the mixed powder are (12~18%) graphene and Al, (62~65%) $Fe_2O_3$, (7~9%) ZnO, (1~3%) SiO2, (1~3%) $B_2O_3$, and (2~17%) Cu-5 wt % Ti.

Step 2: The above mixed powder is combined with polyvinyl alcohol (PVA) liquid and heated to a heating temperature of 82~85° C. Then, spray granulation is performed to obtain a low-temperature self-propagating composite material.

Step 3: The low-temperature self-propagating composite is stirred and mixed with sodium silicate to obtain a slurry.

Step 4: The slurry is injected into the cylindrical inner cavity of the aluminum alloy workpiece, the aluminum alloy workpiece is mounted on a horizontal rotary table for rotation, and the aluminum alloy workpiece is heated during rotation at a heating temperature of 80~100° C. so that the slurry is uniformly solidified on the inner surface of the cylindrical inner cavity.

Step 5. After the slurry is uniformly solidified, while the rotation is maintained, the solidified slurry is burned with an oxyacetylene flame to make it react to form a coating.

In some embodiments, the flame temperature of oxyacetylene is 300-500° C. In some embodiments, the rotational speed of the aluminum alloy workpiece is 40~80 RPM, and the outer wall of the aluminum alloy workpiece is cooled synchronously by compressed air when it is burned with the oxyacetylene flame. In some embodiments, the compressed air pressure is 0.1~0.2 MPa, and the compressed air temperature is 15~20° C.

In some embodiments, as in step 1, the graphene powder and Al powder are evenly mixed and then ball milled in a liquid medium (e.g., alcohol) for 7-10 hours at a milling speed of 5-9 RPM. In some embodiments, after ball milling, ultrasonic treatment is performed at a frequency of 20~25 Hz for 2~3 hours, and then drying treatment is performed at 60~90° C. for 2-3 hours.

In some embodiments, the particle sizes of the $Fe_2O_3$, ZnO, $SiO_2$, $B_2O_3$ and Cu-5 wt % Ti alloy powders in step 1 are 1-3 μm, 1-2 μm, 1-2 μm, 1-2 μm, and 1-2 μm, respectively.

In some embodiments, the mixed powder and polyvinyl alcohol liquid are mixed evenly and heated, the heating temperature is 82~85° C., and then spray granulation is performed to obtain a low-temperature self-propagating composite material. In some embodiments, for step 2, a polyvinyl alcohol liquid is used as the binder, and the mass ratio of the polyvinyl alcohol after mixing is 5~8%.

In some embodiments, the inner wall of the aluminum alloy workpiece is roughened by sand blasting. The sand blasting includes 60~80-mesh $Al_2O_3$ sand, and the sand-blasting pressure is 0.3~0.4 MPa. In some embodiments, the inner diameter of the cylindrical cavity is 35~100 mm.

In some embodiments, the mass ratio of the low-temperature self-propagating composite to sodium silicate is (85-90):(10-15) in step 3.

In some embodiments, the rotary table is a centrifuge, the rotation speed of the aluminum alloy workpiece is 120-150 RPM, heating air is used in the centrifugal process at a temperature of 80-100° C., and the centrifugal rotation time is 30-60 min.

One or more embodiments of the present disclosure may have the following advantages. 1) Compared to high-temperature self-propagating synthesis coating technologies, it is proposed in this invention that wetted Cu-5 wt % Ti and $Al_2O_3$ can be added to improve the compactness and bonding strength of the coating. The melting points of $SiO_2$ and $B_2O_3$ are low, and these materials form silicate structures with other oxides in the coating melting and condensation processes in the glass or enamel states and, therefore, reduce the porosity of the coating. The flux of ZnO can reduce the melting temperature of the reaction system while also improving the interfacial fluidity and spreading wettability on the aluminum alloy substrate. Graphene is a new type of carbonaceous solid lubricating material comprising a nano-thin layer. Using graphene to modify nano aluminum powder can not only improve the contact area and exothermic energy of the reaction between nano aluminum powder and $Fe_2O_3$ but also play a role in coating; the friction coefficient and wear rate of the coating can be reduced by the formation of carbon self-lubricating film in the friction-dispersion process.

2) Compared to traditional high-temperature self-propagating coating synthesis technology, the reaction process temperature is lower, and compressed air is used for synchronous cooling the outer wall, ensuring that the aluminum alloy substrate is not overheated during the melting and condensation process.

BRIEF DESCRIPTION OF DRAWINGS

FIG. 1 shows a schematic diagram of the rotary heating method for the aluminum alloy workpiece.

DETAILED DESCRIPTION

One or more embodiments of the present disclosure are described in detail below.

The technical scheme of the invention will be described clearly and completely in combination with the embodiments. Obviously, the described embodiments comprise only a portion of the invention embodiments, not all of them. Based on the embodiments in the invention, all other embodiments obtained by ordinary technicians in the field without creating the work belong to the protection scope of the invention.

Example 1

One or more embodiments of the present disclosure are described as follows:

Step 1: First, the graphene powder and the Al powder are mixed evenly, where the graphene has a lamellar structure and the mass percentage of graphene and Al is 0.1:99.9. In some embodiments, the lamellar thickness is 1 nm.

The mixed powder is obtained by combining $Fe_2O_3$ powder, ZnO powder, $SiO_2$ powder, $B_2O_3$ powder and Cu-5 wt % Ti alloy powder, in which the mass ratio of Cu and Ti in Cu-5 wt % Ti is 95:5.

The results show that the mass percentages of each component in the mixed powder are 12% graphene and Al, 62% $Fe_2O_3$, 7% ZnO, 1% $SiO_2$, 1% $B_2O_3$, and 17% Cu-5 wt % Ti.

Step 2: The above mixed powder is combined with PVA liquid and heated to a heating temperature of 82~85° C. Then, spray granulation is performed to obtain a low-temperature self-propagating composite material.

Step 3: The low-temperature self-propagating composite is stirred and mixed with sodium silicate to obtain a slurry.

Step 4: The slurry is injected into the cylindrical inner cavity of the aluminum alloy workpiece, the aluminum alloy workpiece is mounted on a horizontal turntable for rotation, the aluminum alloy workpiece is heated in the process of rotation to a heating temperature of 80~100° C. so that the slurry is uniformly solidified on the inner surface of the cylindrical inner cavity.

Step 5. After the slurry is uniformly solidified, while the rotation is maintained, the solidified slurry is burned with an oxyacetylene flame to make it react and form a coating.

Furthermore, the oxyacetylene flame temperature is 300° C.

Moreover, the rotational speed of the aluminum alloy workpiece is 40 RPM, and the outer wall of the aluminum alloy workpiece is cooled synchronously by compressed air when it is heated by the oxyacetylene flame. In some embodiments, the compressed air pressure is 0.12 MPa, and the compressed air temperature is 15° C.

Next, as in step 1, the graphene powder and Al powder are evenly mixed and then ball milled and mixed in a liquid medium (e.g., alcohol) at a milling speed of 5 RPM for 7 hours. Additionally, after ball milling, the samples are ultrasonically treated at a frequency of $20_{Hz}$ for 2 hours and then dried at 60° C. for 2 hours.

Furthermore, the particle sizes of the $Fe_2O_3$ powder, ZnO powder, $SiO_2$ powder and Cu-5 wt % Ti alloy powder in step 1 are 1 μm, 1 μm, 1 μm, and 1 μm, respectively.

Next, the mixed powder and polyvinyl alcohol liquid are mixed evenly and heated to a heating temperature of 82° C. Then, spray granulation is performed to obtain a low-temperature self-propagating composite material. In step 2, polyvinyl alcohol liquid is used as the binder, and the mass ratio of polyvinyl alcohol after mixing is 5%.

The inner surface of the workpiece is further roughened by sand blasting the aluminum alloy at a pressure of 0.3 MPa. In particular, the inner diameter of the cylindrical cavity is 35 mm.

Furthermore, in step 3, the mass ratio of the low-temperature self-propagating composite to sodium silicate is 85:15.

Moreover, the rotary table is a centrifuge, the rotation speed of the aluminum alloy workpiece is 120 RPM, the heating air used in the centrifugal process is at a temperature of 80° C., and the centrifugal rotation time is 30 min.

Example 2

One or more embodiments of the present disclosure are described as follows:

Step 1: First, the graphene powder and the Al powder are mixed evenly; the graphene has a lamellar structure and the mass percentage of graphene and Al is 0.2:99.8. In some embodiments, the lamellar thickness is 2 nm.

The mixed powder is obtained by combining $Fe_2O_3$ powder, ZnO powder, $SiO_2$ powder, B2O3 powder and Cu-5 wt % Ti alloy powder, in which the mass percentage of Cu-5 wt % Ti is 95:5.

The results show that the mass percentages of each component in the mixed powder are 14% graphene and Al, 63% $Fe_2O_3$, 8% ZnO, 2% $SiO_2$, 2% $B_2O_3$, and 11% Cu-5 wt % Ti.

Step 2: The above mixed powder is combined with polyvinyl alcohol liquid and heated to a heating temperature of 83° C. Then, spray granulation is performed to obtain a low-temperature self-propagating composite material.

Step 3: The low-temperature self-propagating composite is stirred and mixed with sodium silicate to obtain a slurry.

Step 4: The slurry is injected into the cylindrical inner cavity of the aluminum alloy workpiece, the aluminum alloy workpiece is mounted on a horizontal turntable for rotation, and the aluminum alloy workpiece is heated during the rotation to a heating temperature of 90° C. so that the slurry is uniformly solidified on the inner wall surface of the cylindrical inner cavity.

Step 5. After the slurry is uniformly solidified, while the rotation is maintained, the solidified slurry is burned with an oxyacetylene flame to make it react to form a coating.

Furthermore, the oxyacetylene flame temperature is 400° C.

Moreover, the rotational speed of the aluminum alloy workpiece is 50 RPM, and the outer wall of the aluminum alloy workpiece is cooled synchronously by compressed air when it is heated by an oxyacetylene flame. In some embodiments, the compressed air pressure is 0.1 MPa, and the compressed air temperature is 18° C.

Next, as in step 1, the graphene powder and Al powder are evenly mixed and then ball milled and mixed in a liquid medium (for example, alcohol). The ball milling speed is 6 RPM, and the mixing time is 8 hours. Additionally, after ball milling, the samples are ultrasonically treated at a frequency of 22 Hz for 2.5 hours and then dried at 70° C. for 2.5 hours.

Furthermore, in step 1, the particle size of $Fe_2O_3$ powder is 2 μm, ZnO powder is 1 μm, $SiO_2$ powder is 2 μm, $B_2O_3$ powder is 2 μm, and Cu-5 wt % Ti alloy powder is 1 μm.

Moreover, the mixed powder and polyvinyl alcohol liquid are mixed evenly and heated to a heating temperature of 83° C. Then, spray granulation is performed to obtain a low-temperature self-propagating composite material. In step 2, polyvinyl alcohol liquid is used as the binder, and the mass ratio of polyvinyl alcohol after mixing is 6%.

Furthermore, the inner wall of the aluminum alloy workpiece is roughened by sand blasting. The sand blasting includes 70-mesh $Al_2O_3$ sand at a pressure of 0.3 in particular, the inner diameter of the cylindrical cavity is 50 mm.

Additionally, the mass ratio of the low-temperature self-propagating composite to sodium silicate is 87:13 in step 3.

Moreover, the rotary table is a centrifuge, the rotation speed of the aluminum alloy workpiece is 130 RPM, the heating air used in the centrifugal process, is at a temperature of 90° C., and the centrifugal rotation time is 40 min.

Example 3

One or more embodiments of the present disclosure are described as follows:

Step 1: First, the graphene powder and Al powder are evenly mixed; the graphene is a lamellar structure and the mass percentage of graphene and Al is 0.3:99.7. In some embodiments, the lamellar thickness is 3 nm.

The mixed powder is obtained by combining $Fe_2O_3$ powder, ZnO powder, SiO2 powder, $B_2O_3$ powder and Cu-5 wt % Ti alloy powder, in which the mass percentage of Cu-5 wt % Ti is 95:5.

The results show that the mass percentages of each component in the mixed powder are 15% graphene and Al, 64% $Fe_2O_3$, 8% ZnO, 2% $SiO_2$, 2% $B_2O_3$, and 9% Cu-5 wt % Ti.

Step 2: The above mixed powder is combined with polyvinyl alcohol liquid and heated to a heating temperature of 84° C. Then, spray granulation is performed to obtain a low-temperature self-propagating composite material.

Step 3: The low-temperature self-propagating composite is stirred and mixed with sodium silicate to obtain a slurry.

Step 4: The slurry is injected into the cylindrical inner cavity of the aluminum alloy workpiece, the aluminum alloy workpiece is mounted on a horizontal turntable for rotation, and the aluminum alloy workpiece is heated during the rotation to a heating temperature of 90° C. so that the slurry is uniformly solidified on the inner wall surface of the cylindrical inner cavity.

Step 5. After the slurry is uniformly solidified, while the rotation is maintained, the solidified slurry is burned with an oxyacetylene flame to make it react to form a coating.

Furthermore, the oxyacetylene flame temperature is 400° C.

Moreover, the rotational speed of the aluminum alloy workpiece is 70 RPM, and the outer wall of the aluminum alloy workpiece is cooled synchronously by compressed air when it is heated by an oxyacetylene flame. In some embodiments, the compressed air pressure is 0.2 MPa, and the compressed air temperature is 18° C.

Next, as in step 1, the graphene powder and Al powder are evenly mixed and then ball milled in a liquid medium (e.g., alcohol) for 9 hours at a milling speed of 8 RPM. Additionally, after ball milling, the sample is ultrasonically treated at a frequency of 24 Hz for 2.5 hours and then dried at 80° C. for 2.5 hours.

Furthermore, in step 1, the particle size of $Fe_2O_3$ powder is 2 μm, ZnO powder is 1 μm, $SiO_2$ powder is 2 μm, $B_2O_3$ powder is 2 μm, and Cu-5 wt % Ti alloy powder is 1 μm.

Moreover, the mixed powder and polyvinyl alcohol liquid are mixed evenly and heated to a heating temperature of 84° C. Then, spray granulation is performed to obtain a low-temperature self-propagating composite material. In step 2, polyvinyl alcohol liquid is used as the binder, and the mass ratio of polyvinyl alcohol after mixing is 7%.

Furthermore, the inner wall of the aluminum alloy workpiece is roughened by sand blasting. The sand blasting includes 70-mesh $Al_2O_3$ sand at a pressure of 0.3 MPa In particular, the inner diameter of the cylindrical cavity is 70 mm.

Additionally, in step 3, the mass ratio of the low-temperature self-propagating composite to sodium silicate is 88:12.

Moreover, the rotary table is a centrifuge, the rotation speed of the aluminum alloy workpiece is 140 RPM, the heating air used in the centrifugal process, is at a temperature of 90° C., and the centrifugal rotation time is 50 min.

Example 4

One or more embodiments of the present disclosure are described as follows:

Step 1: First, the graphene powder and Al powder are evenly mixed; the graphene has a lamellar structure and the mass percentage of graphene and Al is 0.5:99.5. In some embodiments, the lamellar thickness is 5 nm.

The mixed powder is obtained by combining $Fe_2O_3$ powder, ZnO powder, $SiO_2$ powder, $B_2O_3$ powder and Cu-5 wt % Ti alloy powder, in which the mass percentage of Cu-5 wt % Ti is 95:5.

The results show that the mass percentages of each component in the mixed powder are 18% graphene and Al, 65% $Fe_2O_3$, 9% ZnO, 3% $SiO_2$, 3% $B_2O_3$, and 2% Cu-5 wt % Ti.

Step 2: The above mixed powder is combined with polyvinyl alcohol liquid and heated to a heating temperature of 85° C. Then, spray granulation is performed to obtain a low-temperature self-propagating composite material.

Step 3: The low-temperature self-propagating composite is stirred and mixed with sodium silicate to obtain a slurry.

Step 4: The slurry is injected into the cylindrical inner cavity of the aluminum alloy workpiece, the aluminum alloy workpiece is mounted on a horizontal turntable for rotation, and the aluminum alloy workpiece is heated during the rotation to a heating temperature of 100° C., so that the slurry is uniformly solidified on the inner wall of the cylindrical inner cavity.

Step 5. After the slurry is uniformly solidified, while the rotation is maintained, the solidified slurry is burned with an oxyacetylene flame to make it react to form a coating.

Furthermore, the flame temperature of oxyacetylene is 500° C.

Moreover, the rotational speed of the aluminum alloy workpiece is 80 RPM, and the outer wall of the aluminum alloy workpiece is cooled synchronously by compressed air when it is heated with an oxyacetylene flame. In some embodiments, the compressed air pressure is 0.2 MPa, and the compressed air temperature is 20° C.

Next, as in step 1, the graphene powder and Al powder are evenly mixed and then ball milled in a liquid medium (e.g., alcohol) for 10 hours at a milling speed of 9 RPM. Additionally, after ball milling, ultrasonic treatment is performed at a frequency of 25 Hz frequency for 3 hours, and then drying treatment is performed at 90° C. for 3 hours.

Furthermore, in step 1, the particle size of $Fe_2O_3$ powder is 3 μm, ZnO powder is 1 μm, $SiO_2$ powder is 2 μm, B2O3 powder is 2 μm, and Cu-5 wt % Ti alloy powder is 1 μm.

Moreover, the mixed powder and polyvinyl alcohol liquid are mixed evenly and heated to a heating temperature of 85° C. Then, spray granulation is performed to obtain a low-temperature self-propagating composite material. In step 2, polyvinyl alcohol liquid is used as the binder, and the mass ratio of polyvinyl alcohol after mixing is 8%.

Furthermore, the inner wall of the aluminum alloy workpiece is roughened by sand blasting. The sand-blasting pressure is 0.4 MPa. In particular, the inner diameter of the cylindrical cavity is 100 mm.

Additionally, in step 3, the mass ratio of the low-temperature self-propagating composite to sodium silicate is 90:10.

Moreover, the rotary table is a centrifuge, the rotation speed of the aluminum alloy workpiece is 150 RPM, the heating air used in the centrifugal process is at a temperature of 100° C., and the centrifugal rotation time is 60 min.

It should be understood that, for those skilled in the art, improvements or transformations can be made according to the above description; all these improvements and transformations shall fall within the protection scope of the appended claims of the invention.

The ranges of this disclosure may be expressed in the disclosure as from about one particular value, to about another particular value, or both. When such a range is expressed, it is to be understood that another embodiment is from the one particular value, to the other particular value, or both, along with all combinations within this range.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A method for generating a wear-resistant coating on a cylindrical inner surface of an aluminum alloy workpiece, comprising:
   mixing 0.1-0.5 wt % of a graphene powder and 99.5-99.9 wt % of an Al powder, the graphene powder has a lamellar structure with a thickness of 1-5 nm;
   combining 12-18 wt % of the mixed graphene powder and the Al powder, 62-65 wt % of an $Fe_2O_3$ powder, 7-9 wt % of a ZnO powder, 1-3 wt % of a $SiO_2$ powder, 1-3 wt % of a $B_2O_3$ powder, and 2-17 wt % of a Cu—Ti alloy powder to obtain a mixed powder, wherein the Cu—Ti alloy powder include 95 wt % of Cu and 5 wt % of Ti;
   combining the mixed power powder with a polyvinyl alcohol (PVA) liquid, heating at 82-85° C., and performing spray granulation to obtain a low-temperature self-propagating composite;
   stirring a slurry comprising the low-temperature self-propagating composite and sodium silicate;
   injecting the slurry into a cylindrical inner cavity of an aluminum alloy workpiece, the aluminum alloy workpiece is mounted on a horizontal rotary table for rotation and is heated with the rotation at 80-100° C. such that the slurry is uniformly solidified on the cylindrical inner surface of the cylindrical inner cavity; and
   burning the slurry, after the slurry is uniformly solidified and while the rotation is maintained, with an oxyacetylene flame to form the wear-resistant coating.

2. The method according to claim 1, wherein the oxyacetylene flame is at 300-500° C.

3. The method according to claim 1, wherein a speed of the rotation is 40-80 RPM, and an outer wall of the aluminum alloy workpiece is synchronously cooled by compressed air when burning with the oxyacetylene flame.

4. The method according to claim 1, further comprising ball milling the graphene powder and the Al powder in a liquid medium at 5-9 RPM for 7-10 hours.

5. The method according to claim 1, wherein particle sizes in the mixed powder are 1-3 μm for the $Fe_2O_3$ powder, 1-2 μm for the ZnO powder, 1-2 μm for the $SiO_2$ powder, 1-2 μm for the $B_2O_3$ powder, and 1-2 μm for the Cu—Ti alloy powder.

6. The method according to claim 1, wherein a dosage of the PVA after the step of combining is 5-8 wt % of the low-temperature self-propagating composite.

7. The method according to claim 1, further comprising roughening and sand blasting the inner surface of the aluminum alloy workpiece, using an $Al_2O_3$ sand of 60-80 mesh and at a sand-blasting pressure of 0.3-0.4 MPa.

8. The method according to claim 7, wherein the slurry includes 85-90 wt % of the low-temperature self-propagating composite and 10-15 wt % of the sodium silicate.

9. The method according to claim 1, wherein during the injecting of the slurry, the rotary table is a centrifuge, a speed of the rotation is 120-150 RPM, a heated air having a temperature of 80-100° C. is used to heat the aluminum alloy workpiece, and a time of the rotation is 30-60 min.

10. The method according to claim 1, wherein an inner diameter of the cylindrical inner cavity is 35-100 mm.

* * * * *